United States Patent Office 3,585,650
Patented June 22, 1971

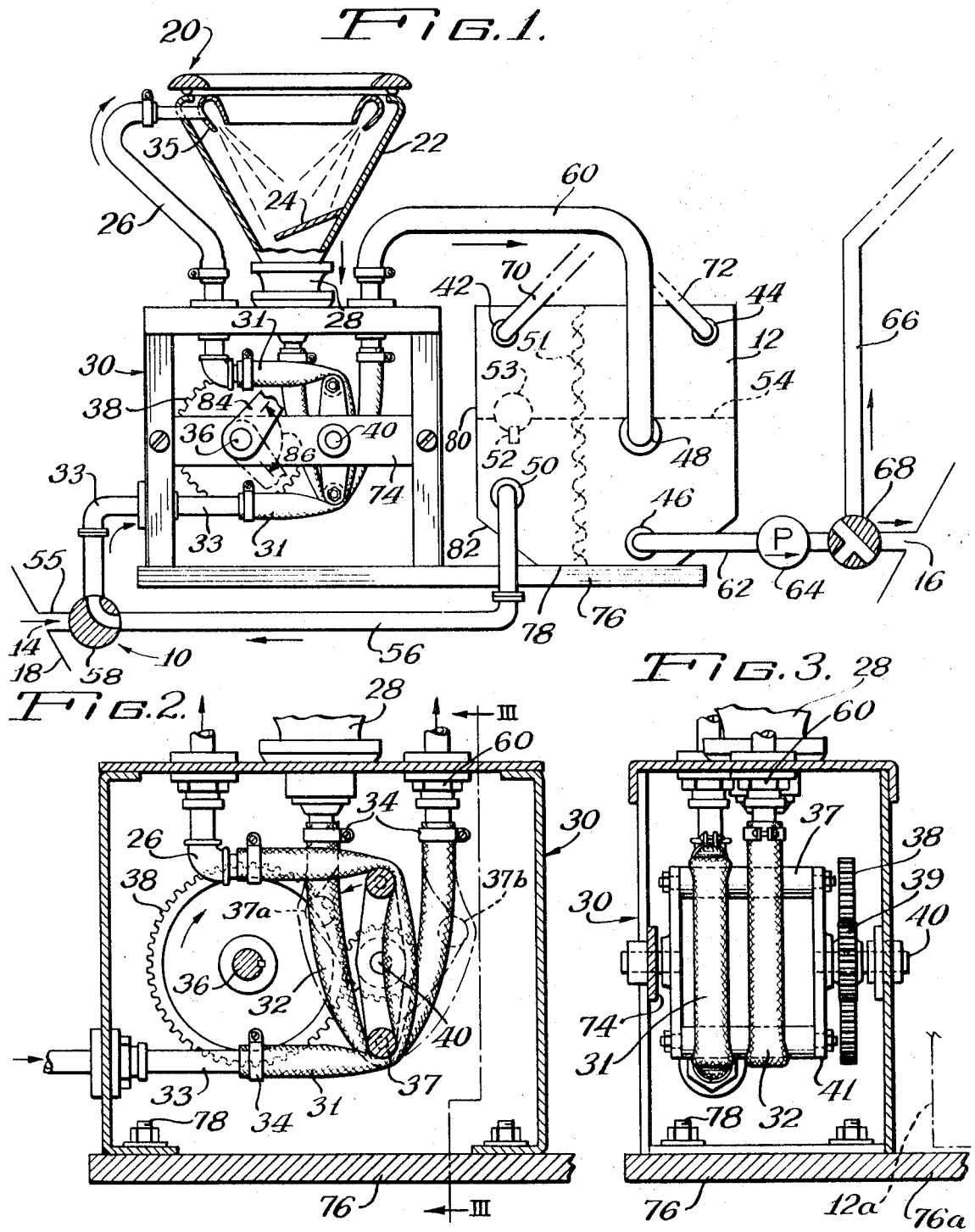

3,585,650
HOSE PUMP AND RECIRCULATING SYSTEM
EMPLOYING SAME
Robert D. Lekberg, 4040 W. 123rd St., Alsip, Ill. 60658, and Roger Daryl Lekberg, 11110 S. Lawler Ave., Worth, Ill. 60482
Filed Jan. 13, 1969, Ser. No. 790,633
Int. Cl. E03d 5/01
U.S. Cl. 4—90
15 Claims

ABSTRACT OF THE DISCLOSURE

Hose pump, and recirculating system employing same and adapted to retain sewage aboard a craft. The pump provides for the forced emptying of a toilet and for the storage by the pump of the waste liquid in a recirculating tank. The pump, by drawing surface rinse liquid from the tank, also provides forced flushing of the toilet. The hose pump has separate rinse and waste sections in which the hose is stretched longer than its normal length, and which afford peristaltic pumping of waste without damage from blockage, and afford retention of a pre-charge of rinse liquid without check valves, and also afford intermittent drawing of waste and a non-spill toilet operation without check valves.

The present invention relates to a toilet and recirculating tank system for holding sewage aboard a craft, and to a pump arranged with separate sections connected to the recirculating tank and with the sections simultaneously effective to draw waste liquid from and force rinse liquid into the toilet. The multisection pump is a hose pump of a particular type, not subject to jamming on uncrushable waste, and providing positive displacement. More importantly, a non-spill toilet results because the pump provides positive sealing, whether idle or in motion and without check valves.

On-board sewage systems provided according to practice in the past use liquid to flush a shipboard toilet and receive, usually by gravity, the wastes therefrom carried in the flushing liquid. In case the flushing lines or line is allowed to empty by reverse flow following each use of the toilet, then in that case the line must be refilled with a fresh pre-charge during the next use and, further in that case, the empty line in the meantime offers a possible avenue for the odors to escape from the waste and to re-enter the toilet. And if the waste line is allowed to remain open it offers an avenue for spilling waste liquid back out of the toilet and also offers an avenue for odors from the waste to re-enter the toilet.

It has therefore been the practice to interpose in the waste line one or more check valves as back-spill and odor traps, or to interpose same in both the waste line and the flushing line. But at least sometimes particles are present in the flushing liquid and, generally, large solids are present in the waste liquid. By their very nature the contents of one or both liquids are sludge formers which cause difficulties with check valves. The desired mechanical operation is inconsistent at best and is interfered with because either the waste makes the check valves stick at times in a valve-open position, or waste paper or adherent or deposit forming particles block the valves from seating completely.

The resulting imperfect sealing or at least inconsistent sealing by check valves in such systems as used hitherto is a decided disadvantage because of odors, spill-out, and other factors, and the stringent sealing conditions present in such prior systems pose a considerable problem. Moreover, the problem is aggravated in recirculating systems because the liquid being recirculated through the pump and flushing lines or line carries thereinto solids which have remained unprecipitated in the recirculating tank and which are carried in suspension or entrainment or as a supernatant in the recirculated liquid. Roll and pitch of the craft tend to keep the odors and suspended particles stirred up, and easily lead to enough back filling of the toilet for the liquid in the bowl to slosh and spill out.

The hose pump type recirculating system provided according to our invention materially reduces or substantially eliminates the foregoing difficulties, disadvantage, and problem, as will now be explained in detail. Features, objects, and advantages will either be specifically pointed out or become apparent when, for a better understanding of the invention, reference is made to the following description taken in conjunction with the accompanying drawing, which shows a preferred embodiment thereof and in which:

FIG. 1 is a front elevational view of a tank and of a pump, the latter viewed from the open forward side, shown together in a recirculating type toilet system embodying our invention;

FIG. 2, shows the pump detail of FIG. 1, in the same view but with parts removed for viewing clarity; and FIG. 3 is a cross sectional elevational view of the pump taken from the left side along the section line III—III of FIG. 2.

More particularly in FIG. 1 of the drawing, a shipboard sewage system 10 having a recirculating holding tank 12 is shown connected between a pair of hull openings consisting of the overboard intake 14 and the overboard discharge 16 of a vessel 18. The system is primarily adapted in its use to original-equipment or retro-fit installation on watercraft, e.g., small boats including sailboats which are at least large enough to be equipped with a ship's head. Notwithstanding the fact that the system is presently shown in only a single embodiment, which understandably is given by way of illustration and not of limitation to our invention, many of the more important principles and advantages of the system are equally applicable to various craft including aircraft.

The shipboard toilet 20 in the system has a bowl 22 provided with a deflector shield 24 having a position therein for a particular purpose later described, and has a regular toilet inlet 26. At a point below and blocked by the shield 24, the toilet has a large-throated discharge 28, the throat of which can be provided with the usual electrically driven waste macerator in cases where such extra feature is desired.

We utilize as the upright stand for the toilet the rigid frame of our novel hose type pump 30. The pump has a first stretch tube section 31 for rinse liquid and a second stretch tube section 32 for the waste liquid received from the toilet.

In terms of hose size and quality, the hose of the respective sections is of the same size preferably and is made identically of flexible-walled, longitudinally stretchable elastomeric material such as a fatigue free plastic which is generally inert chemically to body matter and specifically corrosive toilet wastes. Characteristics generally along the lines of standard milking machine hose are desirable, although there are differences including the fact that milking machine hose usually has less than half the diameter herein required. In terms of position, the hose of the respective sections is arranged in spaced apart adjacency with their plane-of-the-hose in separate planes parallel to one another.

The hose of the first pump section 31 operatively interconnects a long straight fixed pipe forming a pump suction line 33 and a rigidly fixed pipe elbow and nipple forming part of the regular toilet inlet 26. Hose clamps 34 are provided on the parallel pipe and nipple consisting of tightly fitted metal bands and two are disclosed, one embracing each of the opposite ends of the taut hose. The first section of the hose pump operates to draw liquid being recirculated, in a path from the suction line 33 and return it to the system through a downspraying flushing ring 35 into the coplanar mouth of the toilet bowl 22.

Side by side with the first section, the hose of the second section 32 receives waste liquid flowing in the down direction, as indicated by an arrow in FIG. 2, from the toilet discharge 28 and two of the hose clamps 34 tightly embrace opposite ends of the hose to hold it tautly between fixed parallel pipes.

The pump 30 comprises a pressure applying means common to the first and second stretch tube sections, and has drive shaft structure 36 including step up gearing to operate a pair of pressure applying rollers 37. The gearing is an intermeshing pair comprising an input gear 38 and an output pinion 39, the latter of which is made fast to the same output shaft 40 to which a roller presser frame 41 is made fast. The two rollers 37 are diametric in the frame 41 and are rotatably mounted therein so that the rollers are revolved forwardly in the direction indicated by an arrow in which they are carried by the frame and they are simultaneously rotated reversely of that direction due to friction with the wrapped on hose.

In FIG. 1, the recirculating tank 12 is viewed end-on and the outer side of an end wall hereinafter referred to as the end wall shown is seen in face view. A first vent fitting 42 is in one of the opposite upper corners of the end wall shown and a second vent fitting 44 is in the other upper corner. A tank pump out fitting 46 is in the bottom portion of the end wall shown, generally on the same side of the tank as the second vent fitting 44.

The wall carries a brass manifold, not shown, centrally located on the outside in which an intake fitting 48 is mounted generally on the part of the side with the pump out and with the second vent 44, and in which a pick up fitting 50 is mounted on the opposite part of the outer side of the manifold.

On the inner side of the end wall shown, a full length and height, longitudinally extending, vertically disposed baffle screen 51 in the tank 12 divides the interior into a receiving chamber part on the right and a pick up chamber part on the left, as viewed in FIG. 1. A pickup tube which has a downturned mouth or scoop 52 at the free end is carried at that end by a float 53 to swing in a vertical plane, and has a fixed end pivoted adjacent to and in communication with the pick up fitting on the outside of the end wall shown. The tube thus swings as an arm following the liquid level 54 in the tank and the mouth 52 of the tube tends to scoop off surface liquid from which the solids have had a chance to precipitate.

The tank 12 and other details of the system are described in copending Lekberg patent application Ser. No. 729,774, the disclosure of which is incorporated in entirety herein by reference.

The connections and interconnections in the system are made by pipes and hoses as appropriate. A connecting line 55 leading from the overboard intake 14 and a connecting line 56 leading from the tank pick up 50 form a three way junction with the suction line 33 to the pump, and they supply the latter line 33 with flushing liquid drawn from either the intake or pick up. A two way hand valve 58 in the three way junction has a normal position as shown in solid lines in FIG. 1 enabling the toilet to selectively draw from the tank 12. The valve 58 also has a preliminary position reached with a 90° counterclockwise rotation of the valve which intercommunicates the overboard intake and the toilet suction for initial flushing sufficient to introduce a preliminary charge into the recirculating tank 12, as when restarting the system after the tank has been emptied.

The connections by lines 33 and 56 as provided can consist of small hoses equipped with suitable couplings at the ends, and a connection 60 between the second stretch tube section 32 and the tank intake fitting 48 can be made by means of a large diameter hose and rigid pipe fittings at the ends.

A connection 62 which can include an independent pump 64 interconnects the tank pump out fitting 46 and the outboard discharge 16 and provides a forced clean out connection for the system. A line 66 for dockside attachment is connected to the clean out connection to form a second three way junction into which a two way, three position hand valve 68 is connected. The valve is shown in a solid line blocking position, from which it is selectively movable clockwise as viewed in FIG. 1 to intercommunicate the tank pump out and the line 66 or movable counterclockwise to intercommunicate the tank pump out and the overboard discharge 16. The line 66 for dockside attachment leads upwardly to a waste deck fitting, which is flush mounted topside in the vessel for periodic tank clean out use whereby the waste is pumped out into storage facilities on shore. The valve connection to the overboard discharge 16 is closed except under exceptional circumstances, to avoid pollution of the water with raw sewage.

A vent fitting extension 70 leads from an external venting point, not shown, on the side of the vessel (port side as illustrated in FIG. 1) diagonally down to that vent fitting 42 which is on the opposite side of the tank 12. A complementary vent fitting extension 72 leads from an external venting point on the starboard side of the vessel as illustrated, diagonally down to the side vent fitting 44 on the more remote or opposite side of the recirculating tank 12.

For the illustrative purposes of FIG. 1, the pump 30 is shown to have a forwardly facing end in the pump frame which is open except for a horizontal, shaft supporting cross brace 74 thereacross, and is shown to share a common base 76 with the tank 12 appearing at the port side of the pump. In the scale of the illustration, the tank appears comparatively small.

In the actual practice, however, although the shape of the tank 12 is about right as shown so as to be severely V-bottomed in consideration of boat shapes, the tank in proper scale to the toilet will be some two or three times larger than as shown. Also, the tank 12 will be attached to, and aligned end to end with the pump 30 so as to be behind the frame of the pump. Specifically, the tank will be on a rearward extension 76a of the common base in the broken line position as shown by the broken lines 12a in FIG. 3. The pump frame and the tank 12 are secured in place by appropriate hold down fasteners 78 and, obviously, can just as readily be positioned with the end wall shown on the tank in an aft facing direction, and with the pump frame astern thereof and with the open end carrying the cross brace 74 disposed in the aft facing direction. Such flexibility of positioning aboard ship allows the toilet bowl 22 to be oriented in any one of four quadrants, and hence it can adapt to various head designs on boats.

The tank 12 is made of translucent plastic so that the liquid level therein is perceptible by a look at the outside of the tank. The referred to V-bottom in the shape of the tank is achieved by provision of a relatively narrow bottom 78 connected between the end wall shown and the opposite end wall of the tank, and by provision of opposed side wall 80 (FIG. 1), the lower diagonal portions of which are joined to the narrow bottom wall 78 and flare outwardly and upwardly therefrom at an acute vertical angle.

OVERALL OPERATION WITH TANK 12

The overall operation of the system is believed generally apparent from the arrows in the drawing indicating directions of flow and movement, although it will be helpful to point out how the tank 12 has two functions.

To have the tank 12 function solely as a holding tank, the operator rotates the valve 58 about 90° to the left of the position shown in FIG. 1. No odorizing colorant is necessary in the tank, but only about 25% as many uses can be made of the toilet because there is no recirculation function. Employing the tank 12 to provide recirculation requires addition to the liquid of chemicals including a quantity of odorizing colorant, but the tank before it is full of liquid will accommodate about 70 to 100 toilet uses by recirculating the liquid following precipitation.

INTERACTION OF HOSE AND ROLLER

From standpoint of the individual hose, each of the orbiting diametric rollers first establishes contact with the hose at a point opposite the roller by stretching the hose and distorting a portion thereof laterally flat between an existing first chamber being closed off and the succeeding chamber being formed in a passageway, thereafter the roller sustains hose contact while advancing the just said successive chambers in the passageway, and finally the roller releases hose contact to release the surge of the first chamber into the line. The chambers referred to are internal but are believed apparent in FIG. 2.

A roller moving counterclockwise has the broken line position shown by the broken lines 37a immediately after making first contact with the hose of the second section. If, during pump start up, such first contact occurs when the liquid level in the discharge 28 is very low, an undesired back surge tends to occur in the discharge. But the force of the outcoming liquid is dissipated on the shield 24 in the bowl and no back splash due to the surge is perceptible.

The roller in the broken line, hose releasing position relative to the second stretch tube section is shown by the broken lines 37b in FIG. 2.

Generally, but not necessarily so, the hose wraps around the roller in an arc with a radially inner and outer wall stretched flat against the roller and flat against one another throughout the angle of wrap. However, chunks and lumps of waste in the hose passageway are sometimes encountered which resist crushing or mashing and which block the outer wall so that it merely pinches down on the lump and yields by stretching and bulging radially outwardly thereabout. The roller continues in its orbit on past the lump without jamming the pump, and the hydrostatic pressure ahead of the oncoming next roller washes the lump through the hose passageway as soon as the pinched down outer wall of the hose releases the lump.

PUMP GEOMETRY.—FIG. 2

The hose of the first and second pump sections is secantially stretched about a half loop or 180° with respect to the pressure applying means and in a mutually transverse relationship, with the ends of the first section 31 extending substantially parallel to the left as viewed in FIG. 2, and the ends of the second section 32 extending substantially parallel toward the top. The respective resultant tension to the left and resultant tension toward the top exert a cross bias on the pressure applying means preventing the latter from drifting out of position after settling into a static position.

By the same token, the discharge flight (upper flight) of the first section hose extends leftwardly as a secant and the discharge flight, (right flight as viewed in FIG. 2) of the second section hose extends as a secant toward the top. By thus being 90° out of parallelism, the discharge flights of hose are coordinated by the common pressure applying means to release a surge from the line in each section out of phase with the next surge from the other. Hence, pump pulsations are distributed by being equally spaced apart.

PUMP DRIVE.—FIG. 1

The end of the shaft of the pump drive shaft structure 36 can be brought out of the pump frame from either end. If an electric motor drive is provided, it can be disposed at either end and externally connected at that end, or if mounted inside the frame of the pump the drive can be internally connected.

As actually illustrated, however, a pedal structure 84 has a ratchet in the hub and forms a crank connection to the shaft structure 36 to provide a one way drive. The operator uses his foot with a push-release action to pump the pedal structure 84 through the arc of reciprocation 86. A return spring, not shown, biases the pedal structure toward a restored position at the top of its arc.

PUMP SPECIFICATIONS.—ILLUSTRATIVE

Location of the pump 30 and the recirculating tank at a level in the boat common to one another but below the level of the toilet 20 causes a beneficial pressure which enables the identical hose referred to to be used in the pump sections. More specifically, the liquid level in the throat of the toilet discharge 28 is high enough to cause a perceptible gravity head from the toilet, and the pump fill pressure in the waste liquid line and the second section 32 is positive and exceeds pressure in the pump suction line 33 for rinse liquid on the suction side of the first section 31 of the pump.

Because of the larger static head the waste liquid opens the hose walls radially farther apart than does the rinse liquid, and the advancing chambers of waste liquid in the second section hold more volume than do the advancing chambers of rinse liquid in the first section. It has been observed that on the overall average the forced emptying capacity of the hose of the second section exceeds in volume the combined capacity of the first section 31 and the quantity of incoming waste.

So despite the fact that the waste liquid of on board sewage systems appreciably exceeds the rinse liquid in volume, the present system has pump sections with identical hose therein thus simplifying the manufacturer's inventory problem for both pump manufacturing purposes and spare part stocking purposes.

The gearing afforded by the meshing gear and pinion 38 and 39 preferably produces a step up ratio of about 12:1. The arc of reciprocation 86 is desirably about 90°. One revolution of the pressure applying means produces four pump surges, and a full revolution of the drive shaft structure 36 produces 48 pump surges. One cycle of foot movement performs a quarter turn causing three revolutions of the pressure applying means.

It is contemplated that, on the average, foot operation will sustain about 160 r.p.m.'s in the pressure applying means whereas electric operation will go slightly higher, e.g., in the range of 160 to 180 r.p.m.'s.

SEALINGS.—FIG. 2

The hose in each pump section has contact at all times with a pressure applying roller and has contact with two pressure applying rollers twice during each revolution of the frame 41 (e.g., the hose in section 31, FIG. 2). So in the passageway of each hose there is always at least one flattened tensioned hose portion between chambers in the passageway providing a positive-closed, stationary, two-way seal between the toilet and tank when the frame 41 is at rest. When the frame 41 is in its one way rotation, the two way seals lose no effectiveness but nevertheless transform into moving seals, and the chambers they define provide forced feeding and forced emptying of the toilet as they progressively advance in the passageways.

Variations within the spirit and scope of the invention described are equally comprehended by the foregoing description.

What is claimed is.

1. Sewage system of the recirculating type for use aboard a craft comprising:
   a toilet and a recirculating tank having separate rinse liquid and waste liquid lines to intercommunicate same; said tank operating in the system to precipitate out solids from toilet waste liquid received and to return primarily liquid to the toilet;
   a dual section, hose type pump having hose in the sections stretched longer than its normal length, and connections connecting each section of the pump so that the hose thereof is in a different one of, and forms a passageway in, the respective rinse liquid and waste liquid lines between the tank and toilet; and pressure applying means common to the hose of both sections of the pump for tensioning the hose opposite each pressure applying means to laterally flatten the hose portions, thereby closing the passageways opposite each pressure applying means and defining spaced chambers for liquid in the passageways separated by the flattened tensioned hose portions;

said chambers providing forced feeding and forced emptying of the toilet by intercommunication with the tank as they progressively advance in the passageways when the pressure applying means is in motion, and said flattened tensioned hose portions between chambers providing positive-closed, stationary, two-way seals between the toilet and tank when the pressure applying means is at rest.

2. The invention of claim 1, characterized by:
the toilet being at a level substantially above the recirculating tank whereby, due to gravity head introduced by the toilet, the pump fill pressure in the waste liquid line is positive and exceeds pressure on the suction side of the pump in the rinse liquid line;
the hose in terms of nominal hose size and passageway size being substantially the same in the pump sections whereas, in terms of liquid displaced by the pump, the waste liquid appreciably exceeds the rinse liquid in volume.

3. The invention of claim 1, characterized by:
said hose being stretched about the pressure applying means to the extent of at least approximately a half loop in each pump section and extending as a generally secantial discharge flight of hose away from the pressure applying means, the discharge flights of the respective sections being sufficiently out of parallelism that the common pressure applying means each engaging all discharge flights releases a surge from the line in each section out of phase with the next surge from the other, to phase the forced toilet feeding and emptying by the advancing chambers for pump pulsation distribution purposes.

4. The invention of claim 1, characterized by:
said pressure applying means comprising a rotatable frame having input torque applying means connected thereto, and having orbitally moving diametric rollers, respectively establishing contact with the hose by stretching it and distorting a portion laterally flat between an existing first chamber being closed off and the succeeding chamber being formed in a passageway, sustaining hose contact while advancing the just said successsive chambers in the passageway, and releasing hose contact to release the surge of the first chamber into the line; and
a deflector shield in the toilet confronting the waste line to deflect any back surge tending to arise when the pressure applying means first establishes waste-hose contact upon pump start-up.

5. Plural section hose type pump for use in the intercommunicating rinse and waste liquid lines between a shipboard toilet and a recirculating tank, the tank precipitating out solids from toilet waste liquid received, said pump characterized by:
hose in the sections thereof stretched longer than its normal length, and connections for connecting each section of the pump so that the hose thereof is in a different one of, and forms a passageway in, the respective rinse liquid and waste liquid lines between the tank and toilet; and
pressure applying means common to the hose of both sections of the pump for tensioning the hose opposite each pressure applying means to laterally flatten the hose portions, thereby closing the passageways opposite each pressure applying means and defining spaced apart chambers for liquid in the passageways separated by the flattened tensioned hose portions;
said chambers providing forced feeding and forced emptying of the toilet as they progressively advance in the passageways when the pressure applying means is in motion, and said flattened tensioned hose portions between chambers providing positive-closed, stationary, two-way seals between the toilet and tank when the same pressure applying means on all pump sections is at rest.

6. The invention of claim 5, the sections of the pump characterized by:
the hose thereof in terms of nominal hose size being substantially the same.

7. The invention of claim 5, characterized by:
said hose being stretched about the pressure applying means to the extent of at least approximately a half loop in each pump section and extending as a generally secantial discharge flight of hose away from the pressure applying means, the discharge flights of the respective sections being sufficiently out of parallelism that the common pressure applying means releases a surge from the line in each section out of phase with the next surge from the other, to phase the forced toilet feeding and emptying by the advancing chambers for pump pulsation distribution purposes.

8. The invention of claim 5, the pressure applying means characterized by:
a presser frame;
a drive shaft connected to the frame for rotating same;
a flush pedal; and
one-way drive means interconnecting the flush pedal and the drive shaft to insure drive of each of the shaft and frame in one-way only.

9. The invention of claim 5, the respective sections of the hose type pump characterized by:
the hose thereof being secantially stretched about the pressure applying means in a manner whereby the flights of one section and the flights of the other are mutually transverse, with the respective resultant tensions of the two sections exerting a cross bias on the pressure applying means preventing the latter from drifting after settling in a static position.

10. For use installed as original equipment or as retrofitted in existing equipment in connection with a toilet:
a recirculating tank provided with pickup and intake hose means for respective rinse and waste liquids, and adapted to precipitate out solids from toilet waste liquid received and to provide a source of predominantly liquid to be recirculated for flushing the toilet with a rinse liquid;
a multi-section hose type pump, a plurality of which sections have the hose thereof connected to different ones of, and forming separate liquid pumping passageways respectively from and to, the tank pickup and intake hose means, and which sections have the hose therein stretched longer than its normal length; and
pressure applying means which is common to and the same one engages hose of the sections and about which the latter is arranged with the hose of all the sections spaced apart and with their plane-of-the-hose being in separate planes generally parallel to one another.

11. For use installed as original equipment or as retrofitted in existing equipment, recirculating system for a craft comprising:
a toilet provided with inlet and discharge;
a recirculating tank provided with pickup and intake;
said toilet and tank havng lines therebetween, comprising rinse and waste liquid lines intercommunicating respectively said pickup and inlet and said discharge and intake; and
a multi-section hose type pump, a plurality of which sections have the hose thereof connected in different ones of, and forming liquid pumping passageways in, the liquid lines between the toilet and tank; and pressure applying means which is common to and the hose of the same one engages sections and about which the latter is arranged with the hose of all the sections spaced apart and with their plane-of-the hose being in separate planes generally parallel to one another.

12. The invention of claim 11, the pressure applying means characterized by:
   orbitally moving pressure applying members in contact with the hose;
   drive shaft structure carrying said members; and
   one-way power delivery means for applying power to drive said structure and said members in one-way only.

13. For use installed in original equipment or as retrofitted in existing equipment of a shipboard sewage installation, the combination of:
   a hull overboard intake and discharge;
   a tolet having an inlet for rinse liquid and a discharge for waste liquid;
   a recirculating tank having a pickup, an intake, and a pump out;
   three way connecting line means to the respective overboard intake, toilet inlet, and tank pickup and forming a first common junction;
   connections respectively between the toilet discharge and tank intake, and between the tank pump out and the overboard discharge, the latter connection comprising a clean out connection;
   a line for dockside attachment connected in said clean out connection to form a second common junction;
   a dual section, hose type pump having hose in the sections stretched longer than its normal length;
   said pump having each section thereof connected so that the hose thereof is in a different one of, and forms the liquid passageway in, the respective toilet suction for rinse liquid and toilet discharge for waste liquid, whereby the pump sections for regular flushing of the toilet draw rinse liquid through the first common junction from the recirculating tank and pickup thereof and draw waste liquid through the toilet discharge and store same in the recirculating tank; and
   pressure applying means common to the hose of both sections and tensioning same to form in the passageways respective flattened tensioned hose portions and spaced chambers alternating therewith and separated thereby;
   said chambers providing forced feeding and forced emptying of the toilet as they progressively advance in the passageways when the pressure applying means is in motion, and said flattened tensioned hose portions between chambers providing positive-closed, stationary, two-way seals between the tank and toilet when the pressure applying means is at rest.

14. The invention of claim 13, characterized by:
   a first valve in the first common junction having a normal position for the regular flushing aforesaid and another position enabling the pump to selectively draw from the overboard intake for initial flushing sufficient to introduce a preliminary charge of liquid in the recirculating tank.

15. The invention of claim 14, further characterized by:
   an independent pump in the clean out connection upstream of the second common junction; and
   a second valve in the second common junction enabling the just said independent pump to pump waste liquid through said second valve selectively to the overboard discharge or to the dockside attachment line.

References Cited

UNITED STATES PATENTS

| 2,018,998 | 5/1934 | De Bakey et al. | 103—149 |
| 2,487,205 | 11/1949 | Young | 4—77 |
| 3,035,274 | 5/1962 | Baughman | 4—77 |
| 3,067,433 | 12/1962 | Dietz et al. | 4—78 |
| 3,124,810 | 3/1964 | Cobler | 4—90 |
| 3,172,367 | 3/1965 | Kling | 103—149 |
| 3,323,650 | 6/1967 | Kilbane | 4—90 |
| 3,429,273 | 2/1969 | Jones | 103—149 |

LAVERNE D. GEIGER, Primary Examiner

H. K. ARTIS, Assistant Examiner

U.S. Cl. X.R.

103—149